United States Patent
Yang

(10) Patent No.: US 11,349,426 B1
(45) Date of Patent: May 31, 2022

(54) MOTOR CONTROLLER

(71) Applicant: Global Mixed-mode Technology Inc., Hsin-Chu (TW)

(72) Inventor: Chia-Tai Yang, Hsinchu County (TW)

(73) Assignee: Global Mixed-mode Technology Inc., Hsin-Chu (TW)

( * ) Notice: Subject to any disclaimer, the term of this patent is extended or adjusted under 35 U.S.C. 154(b) by 0 days.

(21) Appl. No.: 17/103,985

(22) Filed: Nov. 25, 2020

(51) Int. Cl.
*H02P 27/04* (2016.01)

(52) U.S. Cl.
CPC .................... *H02P 27/04* (2013.01)

(58) Field of Classification Search
CPC .......... H02P 27/04; H02P 6/182; H02P 6/187; H02P 2209/09; H02P 27/08
See application file for complete search history.

(56) References Cited

U.S. PATENT DOCUMENTS

| 10,181,810 | B2 | 1/2019 | Lu | |
|---|---|---|---|---|
| 10,250,172 | B2 | 4/2019 | Boscolo Berto | |
| 2008/0252238 | A1* | 10/2008 | Otaguro | G11B 19/28 318/400.05 |
| 2014/0265967 | A1* | 9/2014 | Brown | H02P 6/182 318/400.27 |
| 2015/0002065 | A1* | 1/2015 | Boscolo | H02P 6/182 318/400.35 |
| 2016/0254766 | A1* | 9/2016 | Brown | H02P 6/20 318/400.35 |
| 2021/0091688 | A1* | 3/2021 | Chen | H02P 6/182 |

FOREIGN PATENT DOCUMENTS

| CN | 110168920 A | 8/2019 |
|---|---|---|
| CN | 111034009 A | 4/2020 |
| TW | 201448447 A | 12/2014 |
| TW | I699959 B | 7/2020 |

* cited by examiner

*Primary Examiner* — Bickey Dhakal
(74) *Attorney, Agent, or Firm* — Winston Hsu

(57) ABSTRACT

A motor controller comprises a switch circuit, a driving circuit, and a pulse width modulation circuit. The switch circuit is coupled to a three-phase motor for driving the three-phase motor. The driving circuit generates a plurality of control signals to control the switch circuit. The pulse width modulation circuit receives a first pulse width modulation signal for generating a second pulse width modulation signal to the driving circuit, where the first pulse width modulation signal has a first duty cycle, and the second pulse width modulation signal has a second duty cycle. When the motor controller starts a floating phase to detect a back electromotive force of the floating phase, the motor controller enables the second duty cycle to be greater than or equal to a minimum value.

6 Claims, 3 Drawing Sheets

MOTOR CONTROLLER

BACKGROUND OF THE INVENTION

1. Field of the Invention

The present invention relates to a motor controller, and more particularly, to a motor controller which may be applied to a three-phase sensorless motor.

2. Description of the Prior Art

Conventionally, there are two driving methods for driving a three-phase motor. The first driving method uses the Hall sensor for switching phases, so as to drive the three-phase motor. The second driving method does not use the Hall sensor to drive the three-phase motor. The Hall sensor is affected by the external environment easily, such that the detecting accuracy is decreased. Besides, the installation of the Hall sensor results in an increase of the volume and the cost of the system. Therefore, the sensorless driving method is provided for solving the above problems.

FIG. 1 shows a timing chart of a conventional sensorless driving method. The pulse width modulation signal Vpw has a duty cycle. Generally, the motor controller controls the motor speed by adjusting the duty cycle. In the sensorless driving method, the motor controller compares the floating phase pin voltage Vf with the reference voltage Vr, so as to detect the back electromotive force of the floating phase for switching phases. The motor controller may utilize the ON time interval of the pulse width modulation signal Vpw for detecting the phase switching time point. Since the floating phase pin voltage Vf varies with the pulse width modulation signal Vpw, it is needed to follow the timing sequence of the pulse width modulation signal Vpw for detecting the phase switching time point correctly. As shown in FIG. 1, the motor controller detects the phase switching time point before the falling edge of the pulse width modulation signal Vpw. This is because after the rising edge of the pulse width modulation signal Vpw, the floating phase pin voltage Vf is unstable due to the switching noise. Therefore, it is chosen to detect the phase switching time point before the falling edge of the pulse width modulation signal Vpw, such that the floating phase pin voltage Vf is under the most stable state. However, when the motor controller utilizes the ON time interval of the pulse width modulation signal Vpw for detecting the phase switching time point, if the ON time interval is too small, it results that the floating phase pin voltage Vf does not have enough time to stabilize. Thus, it is difficult to detect the back electromotive force of the floating phase.

SUMMARY OF THE INVENTION

According to the present invention, a motor controller which is capable of easily detecting a back electromotive force of a floating phase is provided. The motor controller is used for driving a three-phase motor, where the three-phase motor has a first coil, a second coil, and a third coil. The motor controller comprises a switch circuit, a driving circuit, and a pulse width modulation circuit. The switch circuit includes a first transistor, a second transistor, a third transistor, a fourth transistor, a fifth transistor, a sixth transistor, a first terminal, a second terminal, and a third terminal, where the switch circuit is coupled to the three-phase motor for driving the three-phase motor. One terminal of the first coil is coupled to the first terminal. One terminal of the second coil is coupled to the second terminal. One terminal of the third coil is coupled to the third terminal. Furthermore, another terminal of the first coil is coupled to another terminal of the second coil and another terminal of the third coil. That is to say, the first coil, the second coil, and the third coil form a Y-shaped configuration. The driving circuit generates a first control signal, a second control signal, a third control signal, a fourth control signal, a fifth control signal, and a sixth control signal for respectively controlling the ON/OFF states of the first transistor, the second transistor, the third transistor, the fourth transistor, the fifth transistor, and the sixth transistor. The pulse width modulation circuit receives a first pulse width modulation signal for generating a second pulse width modulation signal to the driving circuit, where the first pulse width modulation signal has a first duty cycle and the second pulse width modulation signal has a second duty cycle.

The driving circuit may respectively generate a first voltage vector, a second voltage vector, a third voltage vector, a fourth voltage vector, a fifth voltage vector, and a sixth voltage vector to the switch circuit for activating two of the first coil, the second coil, and the third coil. When the driving circuit generates a first voltage vector to the switch circuit, the driving circuit turns on the first transistor and the fourth transistor and turns off the second transistor, the third transistor, the fifth transistor, and the sixth transistor for activating the first coil and the second coil sequentially. At this moment the floating phase is formed in the third coil. When the driving circuit generates a second voltage vector to the switch circuit, the driving circuit turns on the first transistor and the sixth transistor and turns off the second transistor, the third transistor, the fourth transistor, and the fifth transistor for activating the first coil and the third coil sequentially. At this moment the floating phase is formed in the second coil. When the driving circuit generates a third voltage vector to the switch circuit, the driving circuit turns on the third transistor and the sixth transistor and turns off the first transistor, the second transistor, the fourth transistor, and the fifth transistor for activating the second coil and the third coil sequentially. At this moment the floating phase is formed in the first coil. When the driving circuit generates a fourth voltage vector to the switch circuit, the driving circuit turns on the second transistor and the third transistor and turns off the first transistor, the fourth transistor, the fifth transistor, and the sixth transistor for activating the second coil and the first coil sequentially. At this moment the floating phase is formed in the third coil. When the driving circuit generates a fifth voltage vector to the switch circuit, the driving circuit turns on the second transistor and the fifth transistor and turns off the first transistor, the third transistor, the fourth transistor, and the sixth transistor for activating the third coil and the first coil sequentially. At this moment the floating phase is formed in the second coil. When the driving circuit generates a sixth voltage vector to the switch circuit, the driving circuit turns on the fourth transistor and the fifth transistor and turns off the first transistor, the second transistor, the third transistor, and the sixth transistor for activating the third coil and the second coil sequentially. At this moment the floating phase is formed in the first coil. Consequently, when the driving circuit switches phases based on the sequence of the first voltage vector, the second voltage vector, the third voltage vector, the fourth voltage vector, the fifth voltage vector, and the sixth voltage vector, the three-phase motor is driven for one cycle forwardly. When the driving circuit switches phases based on the sequence of the fourth voltage vector, the fifth voltage vector, the sixth voltage vector, the first voltage vector, the second voltage vector, and the third voltage vector, the three-phase motor is driven for one cycle reversely.

When the motor controller starts the floating phase to detect the back electromotive force of the floating phase, the motor controller limits the second duty cycle of the second pulse width modulation signal, such that the second duty cycle is greater than or equal to a minimum value for avoiding that an ON time interval of the second pulse width modulation signal is too small. Thus, when the motor controller detects the back electromotive force of the floating phase during the ON time interval, it results that the detection becomes easy and the success rate of the detection is increased. Based on different applications, the minimum value may be set to be equal to 10%, 20%, or the other suitable value. When the motor controller is not operated in a floating phase mode, the motor controller enables the second duty cycle of the second pulse width modulation signal is related to the first duty cycle of the first pulse width modulation signal, so as to perform a function of adjusting a speed of the three-phase motor. When the motor controller detects a back electromotive force during a detection time interval, the motor controller decides whether or not to limit the second duty cycle based on the value of the second duty cycle. For example, when the second duty cycle is less than a predetermined value, the motor controller limits the second duty cycle to be equal to the predetermined value. When the motor controller is operated during a non-detection time interval, the motor controller enables that the second duty cycle varies with the first duty cycle, so as to perform a function of adjusting a speed of the three-phase motor.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The above-mentioned and other objects, features, and advantages of the present invention will become apparent with reference to the following descriptions and accompanying drawings, wherein.

DETAILED DESCRIPTION

Preferred embodiments according to the present invention will be described in detail with reference to the drawings.

Figure 1:
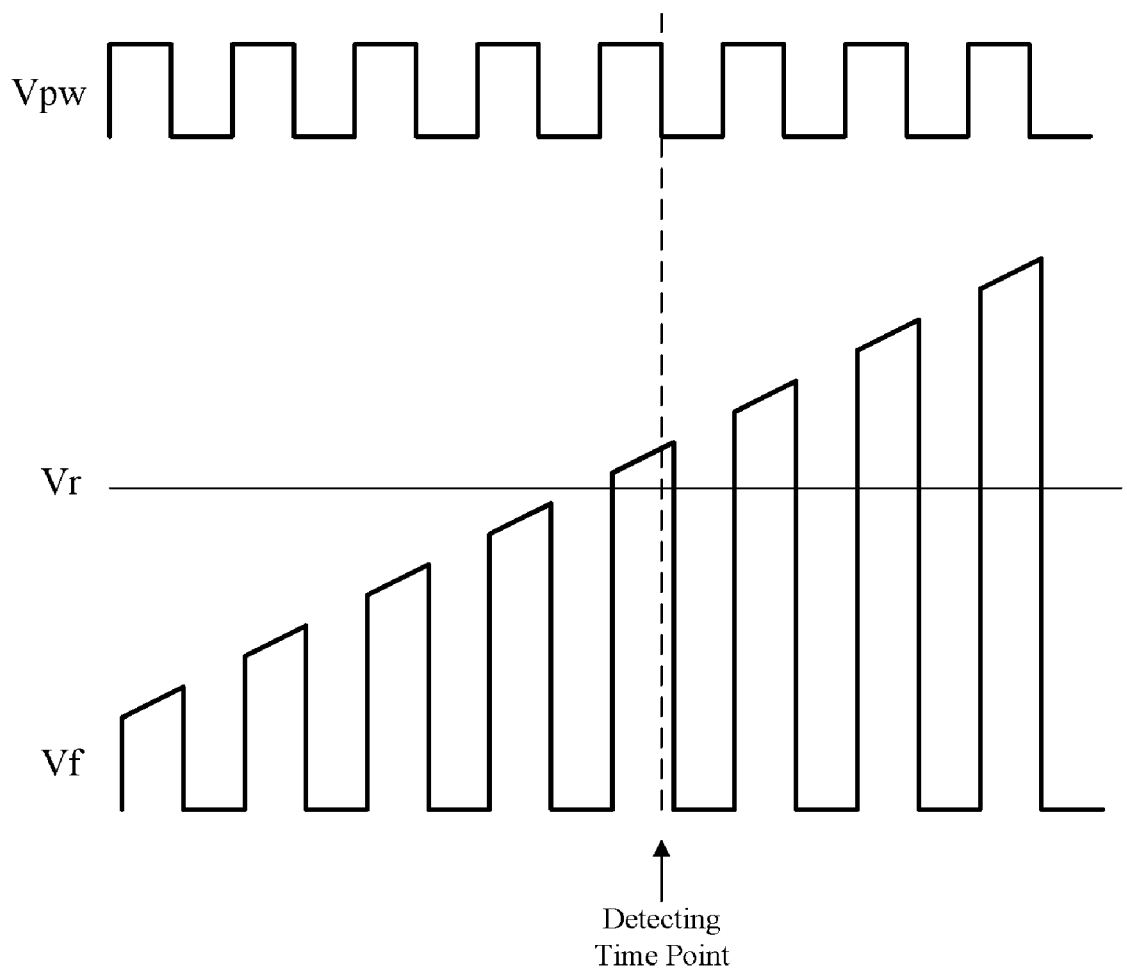
FIG. 1 shows a timing chart of a conventional sensorless driving method.
Figure 2:
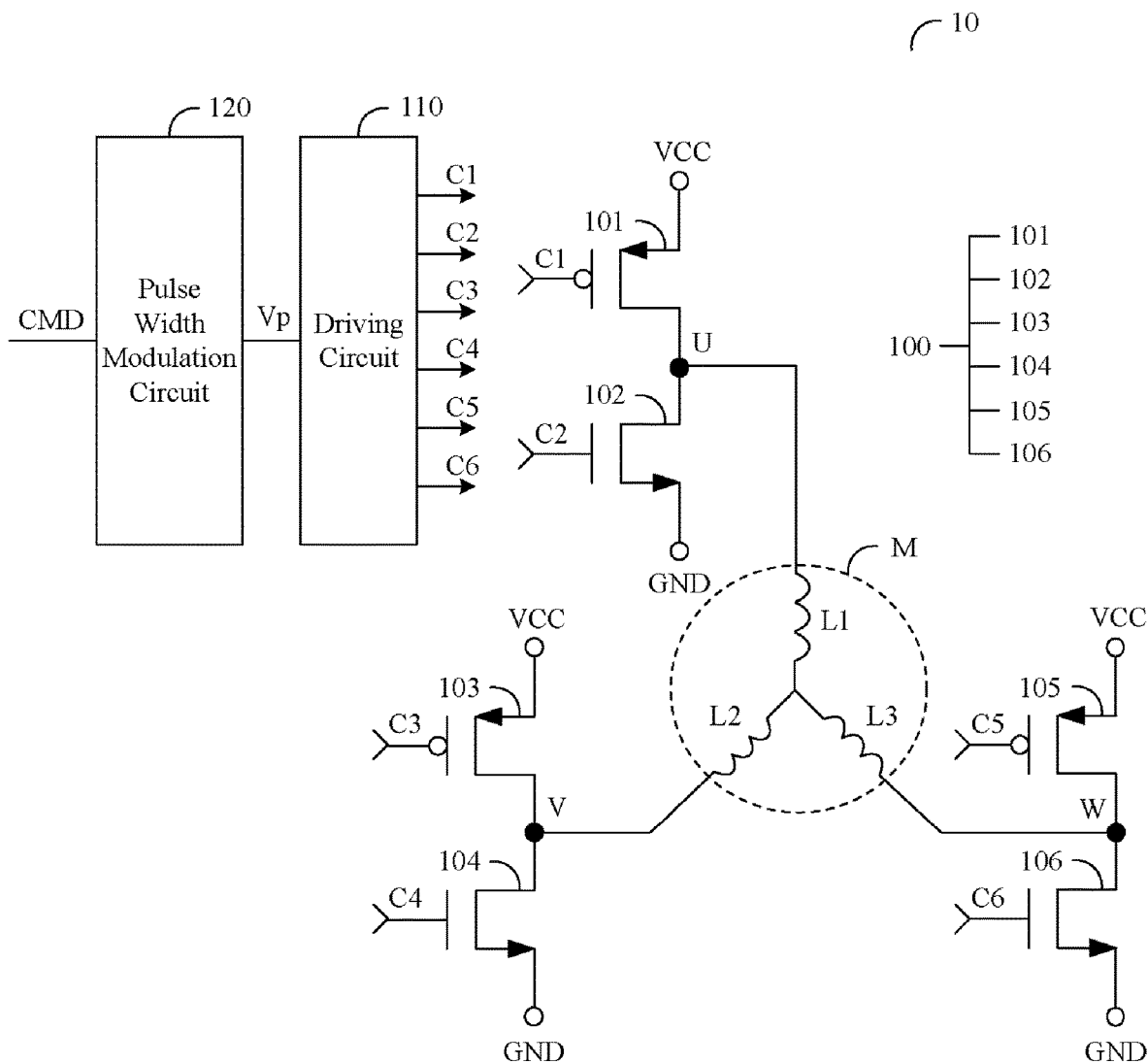
FIG. 2 is a schematic diagram showing a motor controller according to one embodiment of the present invention.

FIG. 2 is a schematic diagram showing a motor controller 10 according to one embodiment of the present invention. The motor controller 10 is used for driving a three-phase motor M, where the three-phase motor M has a first coil L1, a second coil L2, and a third coil L3. The motor controller 10 comprises a switch circuit 100, a driving circuit 110, and a pulse width modulation circuit 120. The switch circuit 100 includes a first transistor 101, a second transistor 102, a third transistor 103, a fourth transistor 104, a fifth transistor 105, a sixth transistor 106, a first terminal U, a second terminal V, and a third terminal W, where the switch circuit 100 is coupled to the three-phase motor M for driving the three-phase motor M. The first terminal U, the second terminal V, and the third terminal W respectively provides a first driving signal Su, a second driving signal Sv, and the third driving signal Sw for driving the three-phase motor M. The first transistor 101 is coupled to a terminal VCC and the first terminal U while the second transistor 102 is coupled to the first terminal U and a terminal GND. The third transistor 103 is coupled to the terminal VCC and the second terminal V while the fourth transistor 104 is coupled to the second terminal V and the terminal GND. The fifth transistor 105 is coupled to the terminal VCC and the third terminal W while the sixth transistor 106 is coupled to the third terminal W and the terminal GND. Each of the first transistor 101, the third transistor 103, and the fifth transistor 105 may be a p-type MOSFET. Each of the second transistor 102, the fourth transistor 104, and the sixth transistor 106 may be an n-type MOSFET.

One terminal of the first coil L1 is coupled to the first terminal U. One terminal of the second coil L2 is coupled to the second terminal V. One terminal of the third coil L3 is coupled to the third terminal W. Furthermore, another terminal of the first coil L1 is coupled to another terminal of the second coil L2 and another terminal of the third coil L3. That is to say, the first coil L1, the second coil L2, and the third coil L3 form a Y-shaped configuration. The driving circuit 110 generates a first control signal C1, a second control signal C2, a third control signal C3, a fourth control signal C4, a fifth control signal C5, and a sixth control signal C6 for respectively controlling the ON/OFF states of the first transistor 101, the second transistor 102, the third transistor 103, the fourth transistor 104, the fifth transistor 105, and the sixth transistor 106. The pulse width modulation circuit 120 receives a first pulse width modulation signal CMD for generating a second pulse width modulation signal Vp to the driving circuit 110, where the first pulse width modulation signal CMD has a first duty cycle and the second pulse width modulation signal Vp has a second duty cycle.

The driving circuit 110 may respectively generate a first voltage vector, a second voltage vector, a third voltage vector, a fourth voltage vector, a fifth voltage vector, and a sixth voltage vector to the switch circuit 100 for activating two of the first coil L1, the second coil L2, and the third coil L3. When the driving circuit 110 generates a first voltage vector to the switch circuit 100, the driving circuit 110 turns on the first transistor 101 and the fourth transistor 104 and turns off the second transistor 102, the third transistor 103, the fifth transistor 105, and the sixth transistor 106 for activating the first coil L1 and the second coil L2 sequentially. At this moment the floating phase is formed in the third coil L3. When the driving circuit 110 generates a second voltage vector to the switch circuit 100, the driving circuit 110 turns on the first transistor 101 and the sixth transistor 106 and turns off the second transistor 102, the third transistor 103, the fourth transistor 104, and the fifth transistor 105 for activating the first coil L1 and the third coil L3 sequentially. At this moment the floating phase is formed in the second coil L2. When the driving circuit 110 generates a third voltage vector to the switch circuit 100, the driving circuit 110 turns on the third transistor 103 and the sixth transistor 106 and turns off the first transistor 101, the second transistor 102, the fourth transistor 104, and the fifth transistor 105 for activating the second coil L2 and the third coil L3 sequentially. At this moment the floating phase is formed in the first coil L1. When the driving circuit 110 generates a fourth voltage vector to the switch circuit 100, the driving circuit 110 turns on the second transistor 102 and the third transistor 103 and turns off the first transistor 101, the fourth transistor 104, the fifth transistor 105, and the sixth transistor 106 for activating the second coil L2 and the first coil L1 sequentially. At this moment the floating phase is formed in the third coil L3. When the driving circuit 110 generates a fifth voltage vector to the switch circuit 100, the driving circuit 110 turns on the second transistor 102 and the fifth transistor 105 and turns off the first transistor 101, the third transistor 103, the fourth transistor 104, and the sixth transistor 106 for activating the third coil L3 and the first coil L1 sequentially. At this moment the floating phase is formed in the second coil L2. When the driving circuit 110 generates a sixth voltage vector to the switch circuit 100, the driving circuit 110 turns on the fourth transistor 104 and the fifth transistor 105 and turns off the first transistor 101, the second transistor 102, the third transistor 103, and the sixth transistor 106 for activating the third coil L3 and the second coil L2 sequentially. At this moment the floating phase is formed in the first coil L1. Consequently, when the driving circuit 110 switches phases based on the sequence of the first voltage vector, the second voltage vector, the third voltage vector, the fourth voltage vector, the fifth voltage vector, and the sixth voltage vector, the three-phase motor M is driven for one cycle forwardly. When the driving circuit 110 switches phases based on the sequence of the fourth voltage vector, the fifth voltage vector, the sixth voltage vector, the first voltage vector, the second voltage vector, and the third voltage vector, the three-phase motor M is driven for one cycle reversely.

Figure 3:
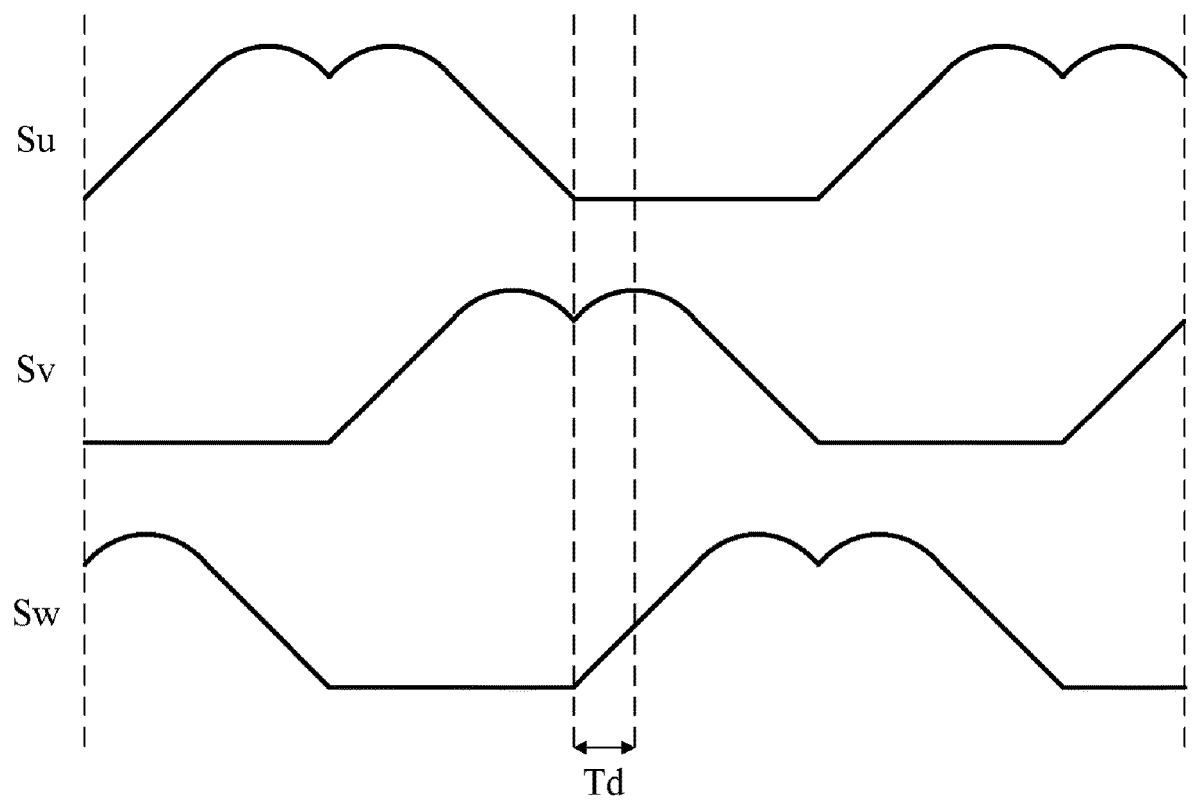
FIG. 3 is a timing chart according to one embodiment of the present invention.

FIG. 3 is a timing chart according to one embodiment of the present invention. Each of the waveform of the first driving signal Su, the waveform of the second driving signal Sv, and the waveform of the third driving signal Sw is similar to an M-shaped waveform. However, the first driving signal Su, the second driving signal Sv, and the third driving signal Sw have a 120-degree phase difference between each other. The second driving signal Sv is 120 degrees behind the first driving signal Su. The third driving signal Sw is 120 degrees behind the second driving signal Sv. By performing the subtraction between the first driving signal Su and the second driving signal Sv, a waveform similar to a sinusoidal wave can be obtained. That is to say, the waveform of the current flowing through the first coil L1 and the second coil L2 is also similar to the sinusoidal wave.

More specifically, when the motor controller 10 starts a floating phase to detect a back electromotive force of the floating phase, the motor controller 10 limits the second duty cycle of the second pulse width modulation signal Vp, such that the second duty cycle is greater than or equal to a minimum value for avoiding that an ON time interval of the second pulse width modulation signal Vp is too small. Thus, when the motor controller 10 detects the back electromotive force of the floating phase during the ON time interval, it results that the detection becomes easy and the success rate of the detection is increased. Based on different applications, the minimum value may be set to be equal to 10%, 20%, or the other suitable value. When the motor controller 10 is not operated in a floating phase mode, the motor controller enables the second duty cycle of the second pulse width modulation signal Vp is related to the first duty cycle of the first pulse width modulation signal CMD, so as to perform the function of adjusting the speed of the three-phase motor M. As shown in FIG. 3, when the motor controller 10 detects a back electromotive force during a detection time interval Td, the motor controller 10 decides whether or not to limit the second duty cycle based on the value of the second duty cycle. For example, when the second duty cycle is less than a predetermined value, the motor controller 10 limits the second duty cycle to be equal to the predetermined value. When the motor controller 10 is operated during a non-detection time interval, the motor controller 10 enables that the second duty cycle varies with the first duty cycle, so as to perform the function of adjusting the speed of the three-phase motor M.

While the present invention has been described by the preferred embodiment, it is to be understood that the invention is not limited to the disclosed embodiment. On the contrary, it is intended to cover various modifications. Therefore, the scope of the appended claims should be accorded the broadest interpretation so as to encompass all such modifications.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A motor controller configured to drive a three-phase motor, wherein the three-phase motor has a first coil, a second coil, and a third coil, and the motor controller comprising:
   a switch circuit, coupled to the three-phase motor, wherein the switch circuit comprises a first terminal, a second terminal, and a third terminal, and the first terminal, the second terminal, and the third terminal respectively providing a first driving signal, a second driving signal, and the third driving signal for driving the three-phase motor;
   a driving circuit, configured to generate a plurality of control signals to control the switch circuit; and
   a pulse width modulation circuit, configured to receive a first pulse width modulation signal for generating a second pulse width modulation signal to the driving circuit, wherein the first pulse width modulation signal has a first duty cycle and the second pulse width modulation signal has a second duty cycle, when the motor controller starts a floating phase to detect a back electromotive force of the floating phase, the motor controller enables the second duty cycle to be greater than or equal to a minimum value, and when the motor controller is not operated in a floating phase mode, the motor controller enables that the second duty cycle is related to the first duty cycle.

2. The motor controller of claim 1, wherein the motor controller detects the back electromotive force of the floating phase during an ON time interval of the second pulse width modulation signal.

3. The motor controller of claim 1, wherein the minimum value is set to be equal to 10%.

4. The motor controller of claim 1, wherein a waveform of the first driving signal is similar to an M-shaped waveform, a waveform of the second driving signal is similar to the M-shaped waveform, and a waveform of the third driving signal is similar to the M-shaped waveform.

5. The motor controller of claim 1, wherein a terminal of the first coil is coupled to the first terminal, a terminal of the second coil is coupled to the second terminal, and a terminal of the third coil is coupled to the third terminal.

6. The motor controller of claim 1, wherein the switch circuit further comprises:
   a first transistor, coupled to a fourth terminal and the first terminal;
   a second transistor, coupled to a fifth terminal and the first terminal;
   a third transistor, coupled to the fourth terminal and the second terminal;

a fourth transistor, coupled to the fifth terminal and the second terminal;
a fifth transistor, coupled to the fourth terminal and the third terminal; and
a sixth transistor, coupled to the fifth terminal and the third terminal.

\* \* \* \* \*